(12) United States Patent
Bolic et al.

(10) Patent No.: US 10,037,222 B2
(45) Date of Patent: Jul. 31, 2018

(54) VIRTUALIZATION OF HARDWARE ACCELERATOR ALLOWING SIMULTANEOUS READING AND WRITING

(71) Applicant: University of Ottawa, Ottawa (CA)

(72) Inventors: Miodrag Bolic, Ottawa (CA); Jonathan Parri, Russell (CA); Wei Wang, Gatineau (CA)

(73) Assignee: UNIVERSITY OF OTTAWA, Ottawa (CA)

(*) Notice: Subject to any disclaimer, the term of this patent is extended or adjusted under 35 U.S.C. 154(b) by 101 days.

(21) Appl. No.: 15/023,694

(22) PCT Filed: Sep. 24, 2013

(86) PCT No.: PCT/CA2013/050725
§ 371 (c)(1),
(2) Date: Mar. 22, 2016

(87) PCT Pub. No.: WO2015/042684
PCT Pub. Date: Apr. 2, 2015

(65) Prior Publication Data
US 2016/0210167 A1 Jul. 21, 2016

(51) Int. Cl.
*G06F 9/455* (2018.01)
*G06F 15/78* (2006.01)

(52) U.S. Cl.
CPC ...... *G06F 9/45558* (2013.01); *G06F 15/7871* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 7,979,857 B2 * | 7/2011 | Esfahany | G06F 9/5016 709/226 |
| 2003/0188100 A1 * | 10/2003 | Solomon | G06F 3/0613 711/114 |

(Continued)

FOREIGN PATENT DOCUMENTS

WO 2009039566 A1 4/2009

OTHER PUBLICATIONS

"DMA Back-End Core User Guide," Northwest Logic Corporation, pp. 1-101 (2009).

(Continued)

*Primary Examiner* — Meng Ai T An
*Assistant Examiner* — Michael W Ayers

(57) ABSTRACT

Technologies are generally provided to virtualize hardware acceleration. In some examples, a coprovisor component may be configured to multiplex multiple domains' requests to access a hardware accelerator such as a field programmable gate array (FPGA), an application specific integrated circuit (ASIC), or a comparable accelerator in a paravirtualized environment. Hyper-requesting may be employed for hardware acceleration virtualization, where a hardware acceleration module concurrently loads a portion of data of a request for a first accelerator application and a portion of data of another request for a second accelerator application and simultaneously processes the two portions of data. Directly situated on a device driver layer, the coprovisor may schedule portions of access requests to the hardware accelerator at the same time through direct memory access (DMA) context switching.

19 Claims, 9 Drawing Sheets

(56) References Cited

U.S. PATENT DOCUMENTS

| | | | |
|---|---|---|---|
| 2008/0052525 | A1 | 2/2008 | Botcheck |
| 2010/0083247 | A1* | 4/2010 | Kanevsky ............... G06F 13/28 718/1 |
| 2010/0281231 | A1* | 11/2010 | Krishnan .............. G06F 13/161 711/167 |
| 2014/0053161 | A1* | 2/2014 | Sadowski ............. G06F 9/4887 718/102 |
| 2014/0123145 | A1* | 5/2014 | Barrow-Williams . G06F 9/5027 718/102 |

OTHER PUBLICATIONS

"FPGA-based Hardware Accelerators in Cloud Computing," accessed at http://carg.site.uottawa.ca/cproj/cproj_FHACC.shtml, accessed on Mar. 15, 2016, pp. 2.
"LogiCORE IP Fast Fourier Transform v7.1," Xilinx Corporation, pp. 1-59 (Mar. 1, 2011).
"Virtex-6 FPGA Integrated Block for PCI Express," Xilinx Corporation, User Guide, pp. 1-382 (Sep. 21, 2010).
"Xen PCI Passthrough," accessed at http://web.archive.org/web/20130630105757/http://wiki.xen.org/wiki/Xen_PCI_Passthrough, last modified on Oct. 17, 2012, pp. 8.
Armbrust, M., et al., "Above the clouds: A berkeley view of cloud computing," Electrical Engineering and Computer Sciences, University of California, Berkeley, Technical Report No. UCB/EECS-2009-28, pp. 1-25 (Feb. 10, 2009).
Barham, P., et al., "Xen and the art of virtualization," Proceedings of the 19th ACM Symposium on Operating Systems Principles (SOSP), pp. 164-177 (Oct. 19-22, 2003).
Bugnion, E., et al., "Bringing Virtualization to the x86 Architecture with the Original VMware Workstation," ACM Transactions on Computer Systems (TOCS), vol. 30, No. 4, pp. 1-51 (Nov. 2012).
Che, S., et al., "Accelerating compute intensive applications with GPUs and FPGAs," Proceedings of the 6th IEEE Symposium on Application Specific Processors, pp. 101-107 (Jun. 8-9, 2008).
Chisnall, D., "The Definitive Guide to the Xen Hypervisor," Prentice Hall Open Source Software Development Series, pp. 1-307 (2007).
Cope, B., et al., "Have GPUs made FPGAs redundant in the field of video processing?," Proceedings of the 2005 IEEE International Conference on Field-Programmable Technology, pp. 111-118 (Dec. 11-14, 2005).
Dowty, M. and Sugerman, J., "GPU Virtualization on VMware's Hosted I/O Architecture," SIGOPS Operating Systems Review, vol. 43, Issue 3, pp. 73-82 (Jul. 2009).
El-Araby, E., et al., "Exploiting partial runtime reconfiguration for High-Performance Reconfigurable Computing," ACM Transactions on Reconfigurable Technology and Systems, vol. 1, Issue 4, pp. 1-25 (Jan. 2009).
El-Araby, E., et al., "Virtualizing and sharing reconfigurable resources in High-Performance Reconfigurable Computing systems," 2nd HPRCTA, pp. 1-8 (Nov. 17, 2008).
Frigo, M. and Johnson, S. G., "The design and implementation of FFTW3," Proceedings of the IEEE, vol. 93, No. 2, pp. 216-231 (Feb. 2005).
Giunta, G., et al., "A GPGPU Transparent Virtualization Component for High Performance Computing Clouds," Proceedings of Euro-Par, Parallel Processing, vol. 6271, pp. 379-391 (2010).
Goldberg, R. P., "Architectural principles for virtual computer systems," Ph.D. Thesis, Division of Engineering and Applied Physics, pp. 1-250 (Feb. 1973).
Gonzalez, I., et al., "Virtualization of reconfigurable coprocessors in HPRC systems with multicore architecture," Journal of Systems Architecture, vol. 58, Issue 6-7, pp. 247-256 (Jun.-Aug. 2012).
Gupta, V., et al., "GViM: GPU-Accelerated Virtual Machines," Proceedings of the 3rd ACM Workshop System-Level Virtualization for High Performance Computing (HPCVirt '09), pp. 17-24 (Mar. 31, 2009).
Huang, C.H., et al., "Model-based platform-specific co-design methodology for dynamically partially reconfigurable systems with hardware virtualization and preemption," Journal of Systems Architecture, vol. 56, Issue 11, pp. 1-46 (Aug. 13, 2010).
Huang, W., et al., "Virtual machine aware communication libraries for high performance computing," Proceedings of the 2007 ACM/IEEE Conference on Supercomputing (SC'07), pp. 1-12 (Nov. 10-16, 2007).
International Search Report and Written Opinion for International Application No. PCT/CA2013/050725, dated Jun. 6, 2014.
Kim, K., et al., "Inter-domain Socket Communications Supporting High Performance and Full Binary Compatibility on Xen," Proceedings of the 4th International Conference on Virtual Execution Environments, VEE 2008, pp. 11-20 (Mar. 5-7, 2008).
Kivity, A., et al., "KVM: The Linux Virtual Machine Monitor," in Proceedings of the Linux Symposium, pp. 225-230 (Jun. 27-30, 2007).
Lagar-Cavilla, H. A., et al., "VMM-independent graphics acceleration," Proceedings of the 3rd International Conference on Virtual Execution Environments, VEE 2007, pp. 33-43 (Jun. 13-15, 2007).
Lübbers, E., "Multithreaded Programming and Execution Models for Reconfigurable Hardware," PhD thesis, Computer Science Department, University of Paderborn, pp. 1-180 (2010) (Abstract Provided).
Ongaro, D., et al., "Scheduling I/O in virtual machine monitors," Proceedings of the 4th International Conference on Virtual Execution Environments, pp. 1-10 (Mar. 5-7, 2008).
Pham, K.D., et al., "Microkernel Hypervisor for a Hybrid ARM-FPGA Platform," IEEE 24th International Conference on Application-Specific Systems, Architectures and Processors (ASAP), pp. 219-226 (Jun. 5-7, 2013).
Ravi, V. T., et al., "Supporting GPU sharing in cloud environments with a transparent runtime consolidation framework," Proceedings of the International Symposium on High Performance Distributed Computing, pp. 217-228 (Jun. 8-11, 2011).
Sabeghi, M. and Bertels, K., "Toward a runtime system for reconfigurable computers: A virtualization approach," Design, Automation and Test in Europe (DATE09), pp. 1576-1579 (Apr. 20-24, 2009).
Shi, L., et al., "vCUDA: GPU Accelerated High Performance Computing in Virtual Machines," IEEE Transactions on Computers, vol. 61, No. 6, pp. 1-14 (Jun. 2012).
Stitt, G., "FPGA Virtualization Strategies for Mainstream High-level Synthesis," NSF Center for High-Performance Reconfigurable Computing, accessed at http://www-labsticc.univ-ubs.fr/~chavet/orga/HLS4HPC_2013/txt/GS_slides.pdf, Jan. 21, 2013, pp. 29.
Wang, J., et al., "XenLoop: A transparent high performance inter-VM network loopback," Proceedings of the 17th International Symposium on High-Performance Distributed Computing (HPDC-17 2008), pp. 109-118 (Jun. 23-27, 2008).
Young, C., et al., "A 32×32×32, spatially distributed 3D FFT in four microseconds on Anton," Proceedings of the Conference on High Performance Computing Networking, Storage and Analysis, pp. 1-11 (Nov. 1-11, 2009).
Zang, X., et al., "XenSocket: A high-throughput interdomain transport for VMs," Proceedings of the ACM/IFIP/USENIX 2007 International Conference on Middleware, pp. 184-203 (2007).

* cited by examiner

VIRTUALIZATION OF HARDWARE ACCELERATOR ALLOWING SIMULTANEOUS READING AND WRITING

CROSS REFERENCE TO RELATED APPLICATION

This Application is a U.S. National Stage filing under 35 U.S.C. § 371 of International Application No. PCT/CA2013/050725, filed on Sep. 24, 2013. International Application No. PCT/CA2013/050725 is herein incorporated by reference in its entirety.

BACKGROUND

Unless otherwise indicated herein, the materials described in this section are not prior art to the claims in this application and are not admitted to be prior art by inclusion in this section.

Cloud computing, which may refer to both applications delivered as services over the Internet and hardware along with systems software in datacenters that provide those services, has taken center stage in information technology in recent years. With virtualization technology, a component of cloud computing, underlying hardware resources may be shared by multiple virtual machines or domains with each running its own operating system (OS). Sharing hardware resources may give rise to higher hardware utilization and lower power consumption. A virtual machine monitor (VMM) (also sometimes may be referred to as a hypervisor), may be typically responsible for isolating each running instance of an OS from an underlying physical machine. The VMM may translate or emulate special instructions of a guest OS.

Graphical processing unit (GPU)- and field programmable gate array (FPGA)-based hardware accelerators are also gaining popularity in the server industry. Accelerators speed up computationally intensive parts of an application. Successfully and efficiently adding hardware accelerators to virtualized servers may bring cloud clients apparent speed-up for a wide range of applications. GPUs may typically be inexpensive and programmed using high-level languages and application programming interfaces (APIs), which abstract away hardware details. FPGAs may outperform GPUs in many specific applications. Moreover, the ability to perform partial run-time reconfiguration may be a distinguishing feature of FPGAs.

Some FPGA virtualization solutions may tend to stay at a multitasking level on a single OS. Prevailing GPU virtualization approaches may primarily intercept and redirect API calls to the hosted or privileged domain's user space, resulting in reduced efficiency and higher overhead. In addition, in some FPGA virtualization or GPU virtualization solutions, the accelerator may typically service only one request each time.

SUMMARY

The present disclosure generally describes techniques to virtualize hardware acceleration.

According to some examples, various methods are provided to access a virtualized hardware acceleration module. An example method may include identifying a first access request from a first virtual machine (VM) for a first accelerator application executable on the hardware acceleration module and identifying a second access request from a second VM for a second accelerator application executable on the hardware acceleration module. The method may also include scheduling the first access request and the second access request using a coprovisor. The method may further include causing the hardware acceleration module to process at least a portion of the first access request and a portion of the second access request by loading the portion of the first access request for the first accelerator application and the portion of the second access request for the second accelerator application and simultaneously processing the first and second portions of the access requests.

According to other examples, various coprovisors are described to virtualize a hardware acceleration module. An example coprovisor may include a request insertion module executable on a processor. The request insertion module may be configured to identify a first access request from a first virtual machine (VM) for a first accelerator application executable on the hardware acceleration module and identify a second access request from a second VM for a second accelerator application executable on the hardware acceleration module. The example coprovisor may also include a scheduler module executable on a same processor. The scheduler module may be configured to schedule the first access request and the second access request. The coprovisor may be configured to cause the hardware acceleration module to process at least a portion of the first access request and a portion of the second access request by loading the portion of the first access request for the first accelerator application and the portion of the second access request for the second accelerator application and simultaneously processing the first and second portions of the access requests.

According to further examples, various datacenters are provided to virtualize hardware acceleration. The datacenter may include at least a first virtual machine (VM) and a second VM, each operable to be executable on one or more physical machines, a hardware acceleration module configured to execute at least a first accelerator application and a second accelerator application, and a datacenter controller executable on one or more servers. The datacenter controller may be configured to identify a first access request from a first virtual machine (VM) for a first accelerator application executable on the hardware acceleration module and identify a second access request from a second VM for a second accelerator application executable on the hardware acceleration module. The datacenter controller may also be configured to schedule the first access request and the second access request, and cause the hardware acceleration module to process at least a portion of the first access request and a portion of the second access request by loading the portion of the first access request for the first accelerator application and the portion of the second access request for the second accelerator application and simultaneously processing the first and second portions of the access requests.

According to yet further examples, a non-transitory computer readable storage medium may store instructions to access a virtualized hardware acceleration module at a datacenter. In response to execution of the instructions on one or more computing devices, methods similar to those described herein may be executed.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
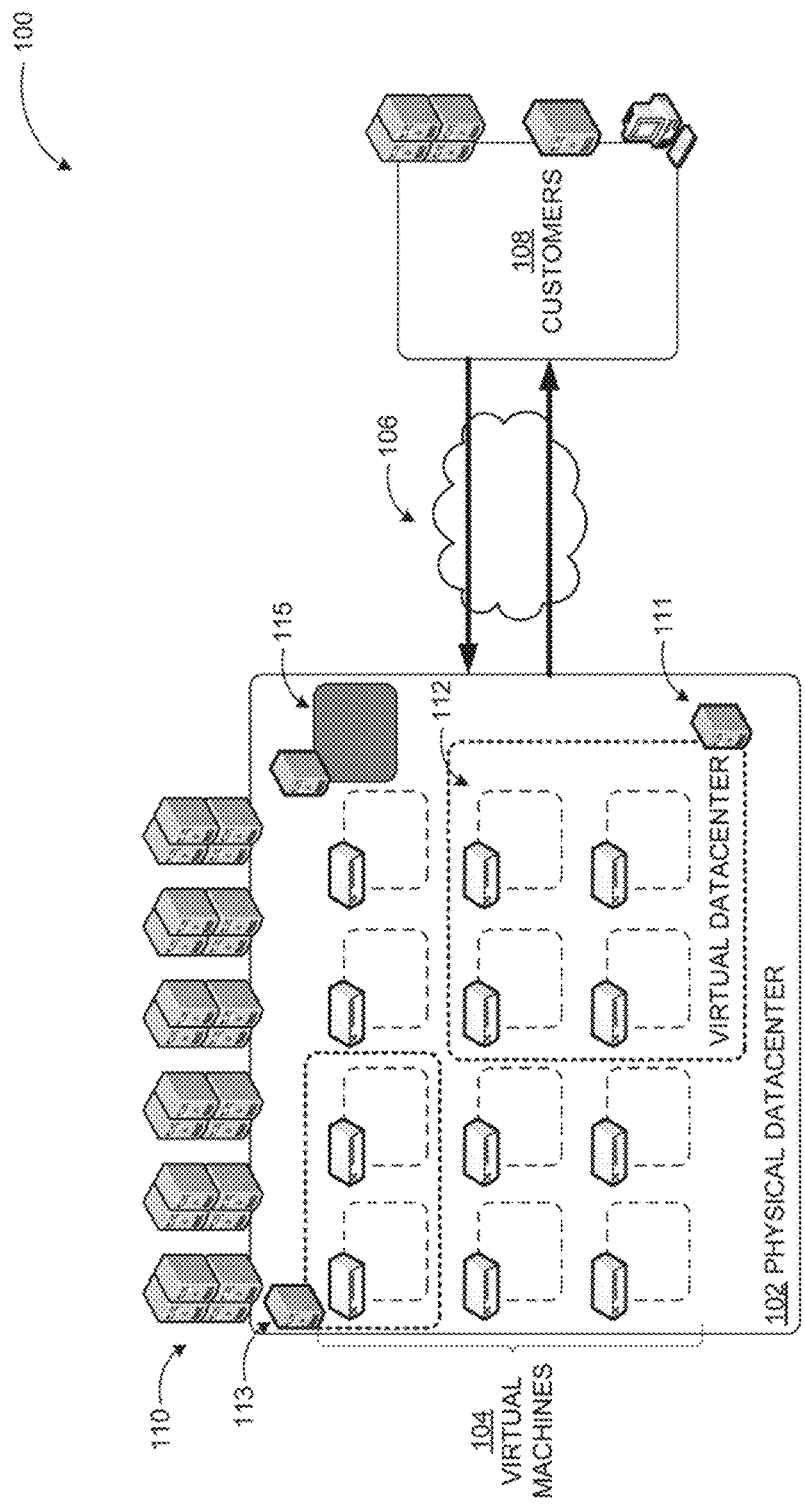
FIG. 1 illustrates an example datacenter-based system, where virtualization of hardware accelerators may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to accessing or otherwise operating a virtualized hardware acceleration module.

Briefly stated, technologies are generally described to virtualize hardware acceleration. In some examples, a coprovisor component may be configured to multiplex multiple domains' requests to access a hardware accelerator such as a field programmable gate array (FPGA), an application specific integrated circuit (ASIC), or a comparable accelerator in a paravirtualized environment. Hyper-requesting may be employed for hardware acceleration virtualization, where a hardware acceleration module concurrently loads a portion of data of a request for a first accelerator application and a portion of data of another request for a second accelerator application and simultaneously processes the two portions of data. Directly situated on a device driver layer, the coprovisor may schedule portions of access requests to the hardware accelerator at the same time through direct memory access (DMA) context switching.

Embodiments may be implemented at machine-level or datacenter-level involving multiple servers and hardware accelerators. Furthermore, hardware accelerators, as used herein, may include for example FPGAs, ASICs, and similar very large scale integrated (VLSI) circuits. In datacenter implementations, multiple virtual machines (VMs) executed on one or more physical servers may submit requests to one or more hardware accelerators (e.g., FPGAs), where the requests may be scheduled by a coprovisor.

A datacenter as used herein may refer to an entity that hosts services and applications for customers through one or more physical server installations and one or more virtual machines executed in those server installations. Customers of the datacenter, also referred to as tenants, may be organizations that provide access to their services for multiple users. One example configuration may include an application that performs computationally intensive computations such as those used in financial markets or scientific computations hosted by one or more datacenters, where the datacenter(s) may employ acceleration. Thus, a consumer may communicate with those applications of the retail service through a client application such as a browser over one or more networks and receive the provided service without realizing where the individual applications are actually executed. This scenario contrasts with configurations where each service provider would execute their applications and have their users access those applications on the retail service's own servers physically located on retail service premises.

FIG. 1 illustrates an example datacenter-based system, where virtualization of hardware accelerators may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers at computing devices, via a cloud 106.

In some examples, a paravirtualized FPGA (pvFPGA) accelerator 115 may be implemented as part of the physical datacenter 102 (or external to it) and may use shared memory for data transfer between VMs. A VM may access the FPGA accelerator 115 through one call while typical GPU implementations may employ numerous API calls. Moreover, unlike in the GPU virtualizations, a multiplexing scheme may supply different VMs with different maximum data transfer bandwidths. Different maximum data transfer bandwidths for VMs may be achieved through regulation of the size of a shared data pool. A coprovisor may manage the multiplexing of the FPGA accelerator 115 at the device driver layer. Additionally, the DMA context switching may enable the FPGA accelerator 115 to service more than one request simultaneously.

Figure 2:
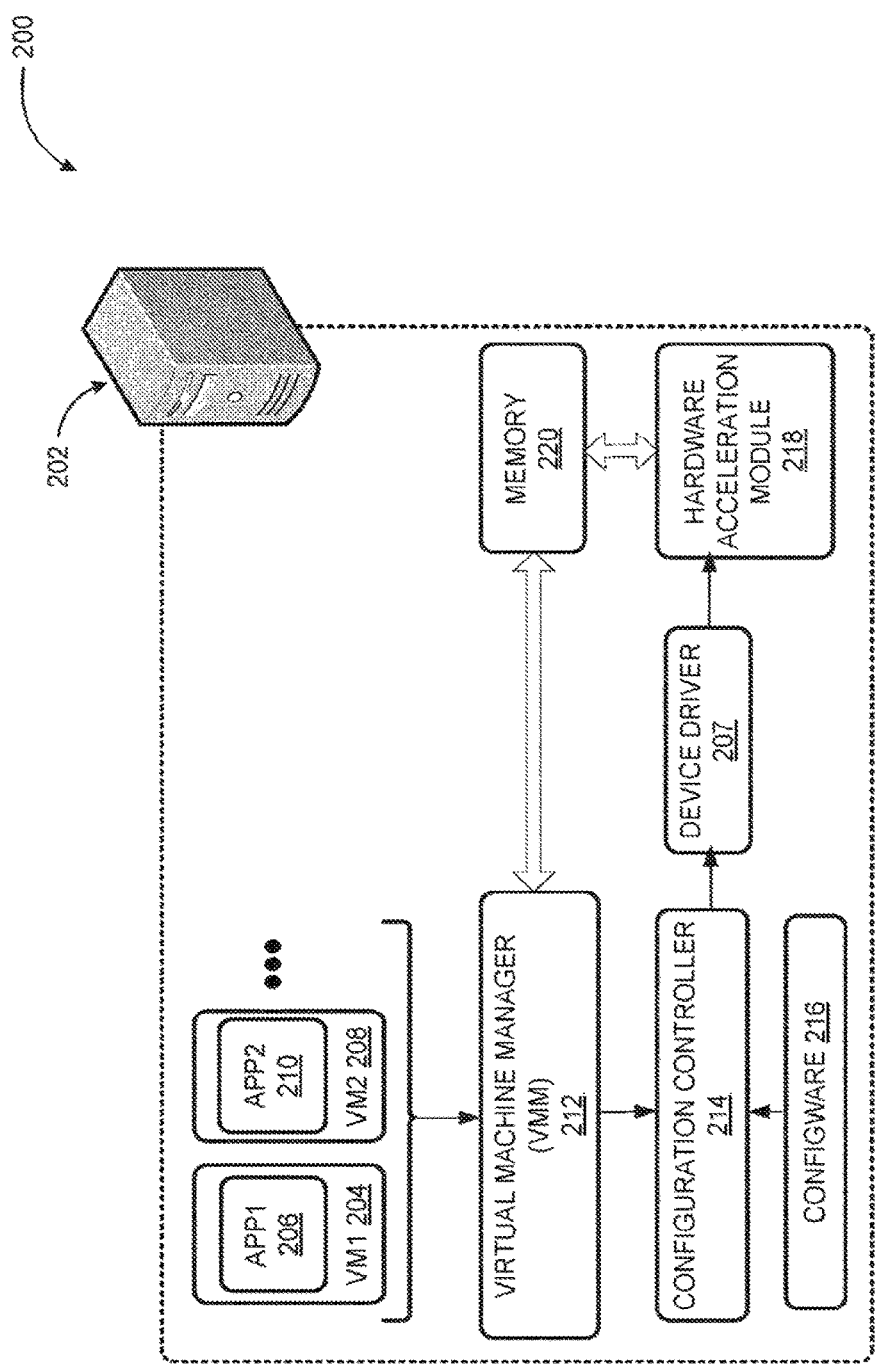
FIG. 2 illustrates an example system, where hardware accelerators may be implemented.

FIG. 2 illustrates an example system, where hardware accelerators may be implemented, arranged in accordance with at least some embodiments described herein.

As shown in diagram 200, a physical server 202 (e.g., the physical servers 110, 111, or 113 in FIG. 1) may be configured to execute a number of virtual machines, such as a first virtual machine 204, a second virtual machine 208, and other virtual machines (not shown). Each of the virtual machines may execute one or more applications. For example, the first virtual machine 204 may execute a first application (app1) 206 and the second virtual machine 208 may execute a second application (app2) 210. A virtual machine manager (VMM) 212 may be configured to manage the virtual machines.

The physical server 202 may also include a hardware acceleration module 218. The hardware acceleration module 218 may be configured to implement hardware accelerators to increase computing efficiency and lower operating costs for parallelizable processes or applications. In some embodiments, the hardware acceleration module 218 may include an FPGA, an ASIC, or a similar integrated circuit having multiple logic cells or digital units, which may be combined to form circuits and/or processors with various features or functionalities. A configuration controller 214 may be configured to load one or more hardware accelerators (e.g., as one or more configware or configuration files, described in more detail below) onto the hardware acceleration module 218. In some embodiments, each hardware accelerator loaded on the hardware acceleration module 218 may be associated with one or more applications implemented on the virtual machines. For example, one hardware accelerator may be associated with the first application (app1) 206 and another hardware accelerator may be associated with the second application (app2) 210. In some embodiments, the virtual machines 204, 208 may transfer part of their computing loads to the associated hardware accelerators on the hardware acceleration module 218 by, for example, communicating data via a shared system memory 220. This may increase the computing efficiency and speed of the virtual machines 204, 208 and the applications 206, 210.

In some embodiments, the configuration controller 214 may be configured to load hardware accelerators onto the hardware acceleration module 218 based on one or more configuration programs or configware 216. The configware 216 may include descriptor files for hardware accelerators to be loaded onto the hardware acceleration module 218. For example, the descriptor files in the configware 216 may list the various digital elements and inputs/outputs to be coupled on or to the hardware acceleration module 218 in order to load a particular hardware accelerator on the hardware acceleration module 218. In some embodiments, the descriptor files may take the form of hardware descriptor language (HDL) files, which may be compiled to provide netlist files. The netlist files in turn may include detailed lists of connections and elements of the hardware accelerator circuits. Formats other than HDL may also be used for implementing various embodiments. In some embodiments, the configware 216 may also (or instead) include binary files corresponding to hardware accelerators, for example compiled from the appropriate descriptor files.

Figure 3:
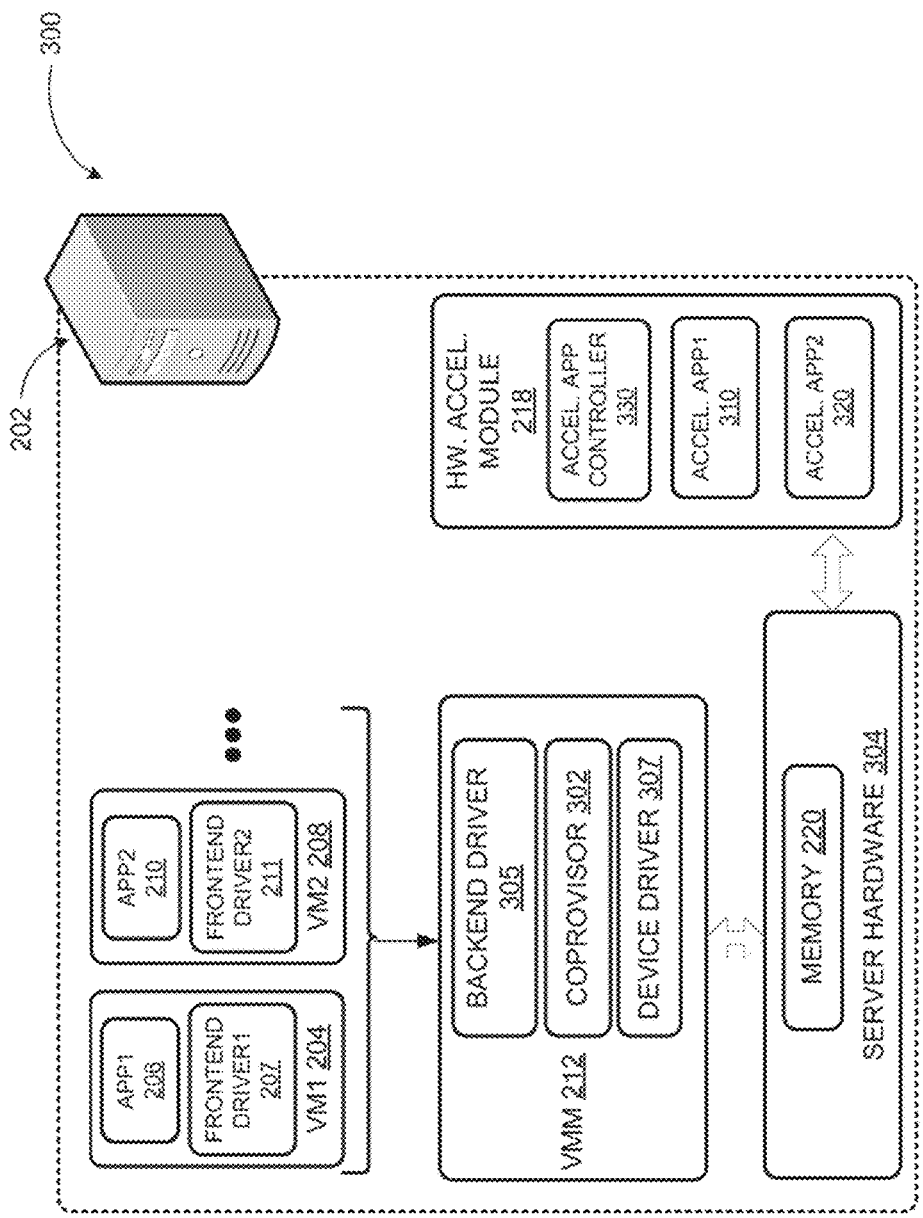
FIG. 3 illustrates an example system, where a hardware accelerator may be virtualized using a coprovisor.

FIG. 3 illustrates an example system, where a hardware accelerator may be virtualized using a coprovisor, arranged in accordance with at least some embodiments described herein.

As mentioned above, the hardware accelerator may be part of an FPGA or an ASIC. In some examples, a first data block associated with a first VM access request from a first VM may be identified via a first shared memory space and a second data block associated with a second VM access request from a second VM may be identified via a second shared memory space. A size associated with the first shared memory space and/or the second shared memory space may be adjusted based on a priority associated with the first VM and/or the second VM. A coprovisor managing access to the virtualized hardware accelerator may cause the hardware accelerator to load the first data block and/or the second data block using a DMA read operation. An access request may be implemented in three stages: a DMA read operation stage, an accelerator application computation stage, and a DMA write operation stage. A DMA read operation stage may be implemented simultaneously with a DMA write operation stage. The first VM access request and the second VM access request may be scheduled based on a first memory access context associated with the first VM access request and/or a second memory access context associated with the second VM access request. The first memory access context may be based on a request control block (RCB) associated with the first VM access request, and the second memory access context may be based on an RCB associated with the second VM access request. An RCB may be a data structure containing the information needed to schedule a request using DMA, and maintained by a coprovisor. The hardware accelerator may process the portion of the first VM access request and/or the portion of the second VM access request based on an accelerator status word providing a status of the hardware accelerator. Accessing the virtualized hardware accelerator may further include retrieving a status of a device driver 207 associated with the hardware accelerator from the accelerator status word.

Diagram 300 shows an example implementation on a server 202. In some examples, the server 202 may be a server in a datacenter. In other examples, the hardware acceleration module, the controllers (e.g., the coprovisor), and the VMs may be implemented on different servers of a datacenter. In yet other examples, comparable configurations may be employed. In the example configuration of diagram 300, VM1 204 and VM2 208 may execute first application 206 and second application 210, respectively, and include frontend drivers 207 and 211. The VMs may request portions (or entire) of their respective applications to be executed on a hardware acceleration module 218 as first accelerator application (app1) 310 and second accelerator application (app2) 320 through frontend drivers 207 and 211, respectively. To access the hardware-accelerated applications, the VMs may submit requests to a coprovisor 302, which may place the requests in respective queues and submit to the hardware acceleration module 218 simultaneously using DMA context switching. A shared memory 220 as part of the server hardware 304 may be used by the coprovisor 302 in scheduling the requests.

In some examples, a peripheral component interface express (PCIe) or similar interface may be employed as the communication channel and the direct memory access (DMA) technique for efficient transfer of data to and from the host server memory. Unlike traditional ISA (Industrial Standard Architecture) devices, there is no central DMA controller for PCIe components. Therefore, a DMA controller may be implemented on the hardware acceleration module 218. Also referred to as the bus mastering DMA, the DMA controller may reside in the PCIe device to initiate PCIe transactions. Another example may be in a Non-Uniform Memory Access (NUMA) machine with Quick Path Interconnect (QPI), a hardware acceleration module (e.g. FPGA) may be inserted into a processor socket. A DMA controller may also be used in the hardware acceleration module to send and fetch data on top of QPI. Compared with implementing with PCIe, where the hardware acceleration module is treated as a peripheral device, the DMA controller may use physical addresses, instead of bus addresses, for memory accesses with QPI.

Some example embodiments may use a streaming pipeline. That is, the DMA read from the shared memory 220 on the server hardware 304 and DMA write to the shared memory 220 may be implemented simultaneously. An accelerator application controller 330 may direct the input streaming data from the DMA controller to first accelerator application (app1) 310 or second accelerator application (app2) 320, multiplex first accelerator application (app1) 310 and second accelerator application (app2) 320 to use the DMA write channel; maintain the accelerator status word; raise an interrupt when needed. A device driver 307 may indicate the coprovisor 302 to direct the input block of data to either first accelerator application (app1) 310 or second accelerator application (app2) 320 by configuring the accelerator status word before initiating the start of a DMA read data transfer. Both first accelerator application (app1) 310 and second accelerator application (app2) 320 may be active on the hardware acceleration module 218 at the same time. The processing latencies of first accelerator application (app1) 310 and second accelerator application (app2) 320 may be determined by the specific accelerator applications. It may be possible that both first accelerator application (app1) 310 and second accelerator application (app2) 320 finish at the same time and contend for the DMA write channel. Therefore, the accelerator application controller 330 on the hardware acceleration module may be responsible for multiplexing DMA write channel for first accelerator application (app1) 310 and second accelerator application (app2) 320.

The use of the accelerator status word may enhance the interaction between the device driver 307 and the hardware acceleration module 218. More precisely, the driver may know the status of the hardware acceleration module 218 through the accelerator status word. From the perspective of the hardware acceleration module 218, the accelerator status word may indicate to the hardware acceleration module 218 what the device driver 307 needs. An example accelerator status word may include 32 bits with the first bit (bit 0) indicating which accelerator application on the hardware acceleration module is selected for the following block of data and the second bit being set by the hardware acceleration module when one block of data finishes using the DMA read channel. A third bit may indicate which application has finished its processing for one block of data and a fourth bit may be set by the acceleration application controller 330 on the hardware acceleration module when either one of the simultaneously executed applications finishes their processing. An interrupt to the server may be raised upon setting of this bit.

With the help of the accelerator status word, interrupts raised by the hardware acceleration module 218 caused by different events may be distinguished. When a block of data finishes its use of the DMA read channel, a Type 1 interrupt may be raised by the hardware acceleration module 218. When an application (either app1 or app2) finishes its processing, the accelerator application controller 330 may set the bit 1 of the accelerator status word and raise another interrupt (Type 2 interrupt). The differentiation of interrupts may help with DMA context switching, discussed below.

A data pool may be shared between a guest VM and the privileged VM through various mechanisms with VMMs such as a grant table mechanism. To achieve the sharing of a data pool between the VMs, the grant references of these shared memory pages in a data pool may be filled in an extra shared memory page which may act as a page directory. The shared memory pages in the data pool, acting as DMA buffers, may be exposed to the bus master DMA controller residing in the hardware acceleration module 218.

Similar to the data pool, a command channel—a memory page shared between a guest VM and the privileged VM—may be used for transferring command information. In some examples, the command channel may be used to transfer the number of the application that a VM needs to use on the hardware acceleration module 218 and the size of data in the data pool that needs to be transferred to the hardware acceleration module 218, among other similar information. For example, a VM may have a 4 MB data pool, but it may request 256 KB data in the data pool to be transferred for a processing on the hardware acceleration module 218.

A dataflow in a paravirtualized FPGA according to some examples may be described as follows: (1) a process in a guest VM may specify the application number and the data size in the command channel, which may be mapped to the process virtual address space through a system call (e.g., mmap); (2) the process may directly put data in the shared data pool, which may also be mapped to the process virtual address space; (3) the process may notify a frontend driver (207 or 211) in the guest VM's kernel space that data is ready, and transition to a Sleep state; (4) the frontend driver (207 or 211) in the guest VM's kernel space may send a notification to a backend driver 305 in the privileged VM's kernel space; (5) the frontend driver (207 or 211) may pass the request to a device driver 307 in the VM's kernel space, and the device driver 307 may set the DMA transfer data size and the accelerator application number according to a parameter obtained from the command channel; (6) the device driver may initiate the start of the DMA controller in the FPGA accelerator; (7) the DMA controller may transfer the data to the FPGA accelerator in a pipelined way to perform a computation; (8) the DMA controller may transfer the results of the computation back to the data pool; (9) the DMA controller may send an interrupt to the device driver 307 when all the results are transferred to the data pool; (10) the backend driver 305 may send a notification to the frontend driver (207 or 211) that the results are ready, (11) the frontend driver (207 or 211) may wake up the process in sleep state; (12) the process may retrieve the results from the data pool.

Figure 4:
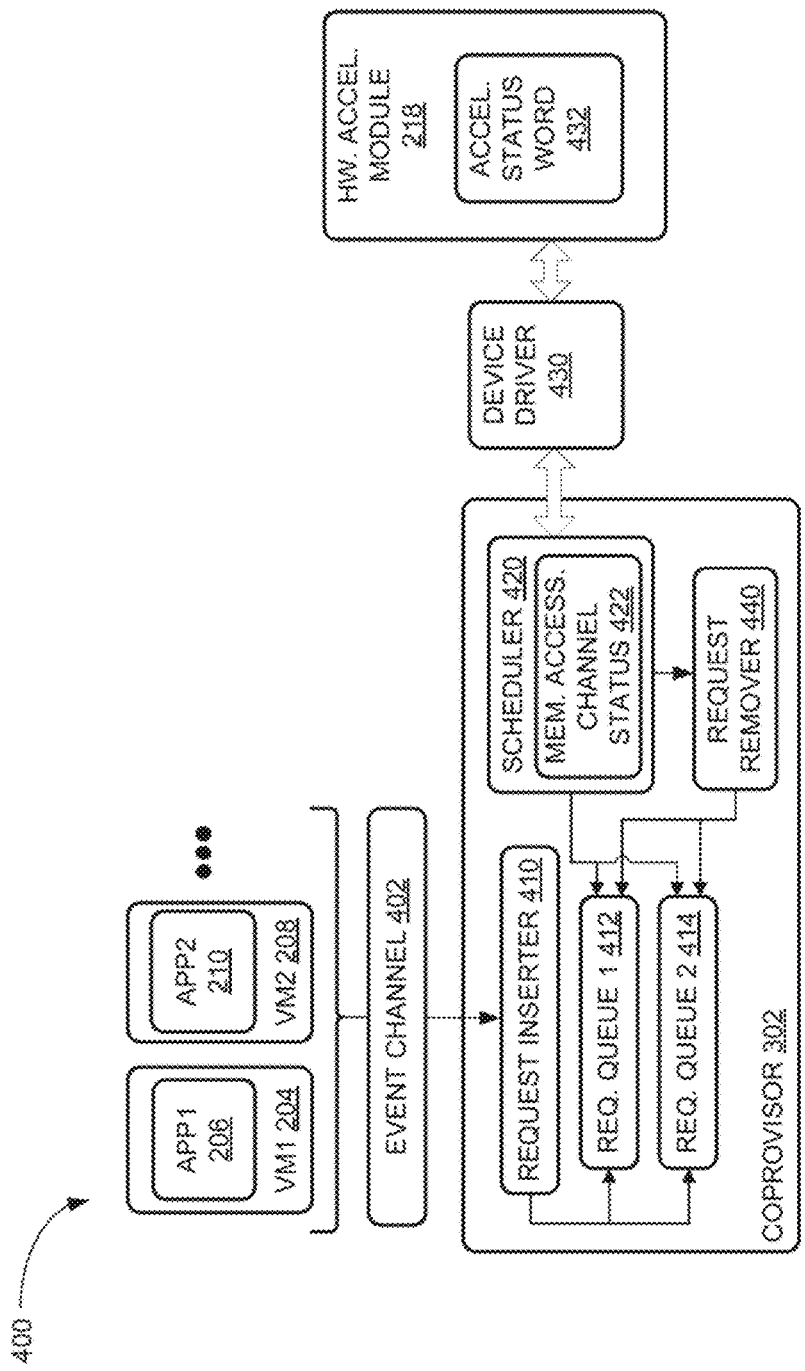
FIG. 4 illustrates an example implementation of a coprovisor.

FIG. 4 illustrates an example implementation of a coprovisor, arranged in accordance with at least some embodiments described herein. The various elements shown in FIG. 4 (as well as in the other figures) can be operatively coupled to each other.

In an example datacenter environment, a datacenter controller, executable on one or more servers of the datacenter may perform tasks described herein in conjunction with the coprovisor. Such tasks may include, but are not limited to identifying an access request from a VM for the first accelerator application; identifying an access request from a VM for the second accelerator application; scheduling access requests; and causing a hardware acceleration module to process at least a portion of the access request for the first acceleration application and a portion of the access request for the second acceleration application at a same time. In a system according to embodiments, any VM may issue a request to either accelerator application on the hardware acceleration module. Thus, the scheduling may be accelerator application oriented, instead of VM oriented.

As shown in diagram 400, the architecture of an example coprovisor 302 may include a request inserter 410, a scheduler 420, a request remover 440, and two or more request queues 412 and 414. First request queue 412 may be used for buffering requests to access the first accelerator application (app1) 310 on the hardware acceleration module 218. Second request queue 414 may be used for buffering requests to access the second accelerator application (app2) 320 on the hardware acceleration module 218. A VM (VM1 204 or VM2 208) may notify the coprovisor 302 via an event channel 402, so the request inserter 410—responsible for inserting requests from the VMs into the corresponding request queues—may be invoked when an event notification is received at a backend driver (backend driver 305 in FIG. 3). When a request is completely serviced, an interrupt from the hardware acceleration module 218 may notify the request remover 440 to remove the serviced request from the corresponding request queue. The scheduler 420 may be responsible for scheduling requests from the two request queues 412 and 414 to access the hardware acceleration module 218 through the accelerator device driver 430. In some examples, requests may be scheduled via first-come, first-served (FCFS), that is, requests in the same queue may be extracted in an orderly manner by the scheduler 420.

A site of a shared data pool by the VMs may imply the maximum data transfer bandwidth. For example, VM1 204 assigned with 4 MB data pool may transfer as much as 4 MB data for each request to the hardware acceleration module 218, while VM2 208 assigned with 512 KB data pool may transfer as much as 512 KB data per request. When the two VMs contend for using the same application on the hardware acceleration module 218 and the acceleration procedures need to send more than 512 KB data, VM2 208 may be slower because it needs to send more requests to finish the entire acceleration. To provide the VMs with different maximum data transfer bandwidths, a split driver designer may regulate the size of the shared data pool in each VM's frontend driver and the privileged VM's backend driver at the frontend/backend driver loading time.

In some embodiments, the scheduler 420 may provide/perform at least: (1) exposing the status of both DMA read and DMA write channels to the device driver 430, such as if the DMA read channel is idle or in use; (2) scheduling a request to use the DMA read channel, which may need to implement a DMA context switch; (3) maintaining a request control block of the head request of both the two queues (for example, when one buffer fragment (storing one block of data) of a request is scheduled to use the DMA read channel, the request state may be updated with DMAWRITE and a current buffer number parameter may be incremented by one); (4) invoking the request remover to remove a request when the request completes using the hardware acceleration module.

To support DMA context switching, requests to access the hardware acceleration module 218 may need to become context-aware. Similar to the functionality of a process control block (PCB), each request may have its own request control block (RCB) which may be used by the coprovisor to set up a DMA executing context.

In some examples, the RCB may be a data stack and include a VM identifier, a port identifier, a request state, an application number, a total buffer number, a current buffer number, and a next request pointer. The VM identifier may denote the identifier of the VM from which the request originates. The port identifier may identify the port number of the event channel and may be used to notify the request's VM through the corresponding event channel. Request states may include, for example, DMA READ, DMA WRITE, and DMA FIN (DMA finished). The application number may specify which accelerator application the request needs to use on the hardware acceleration module (e.g., 0—app0, 1—app1, etc.). The total buffer number may specify a total number of buffer fragments used by the request. The current buffer number may specify a current buffer fragment that needs to be transferred to the hardware acceleration module. The next request pointer may point to the next request in the queue.

Figure 5:
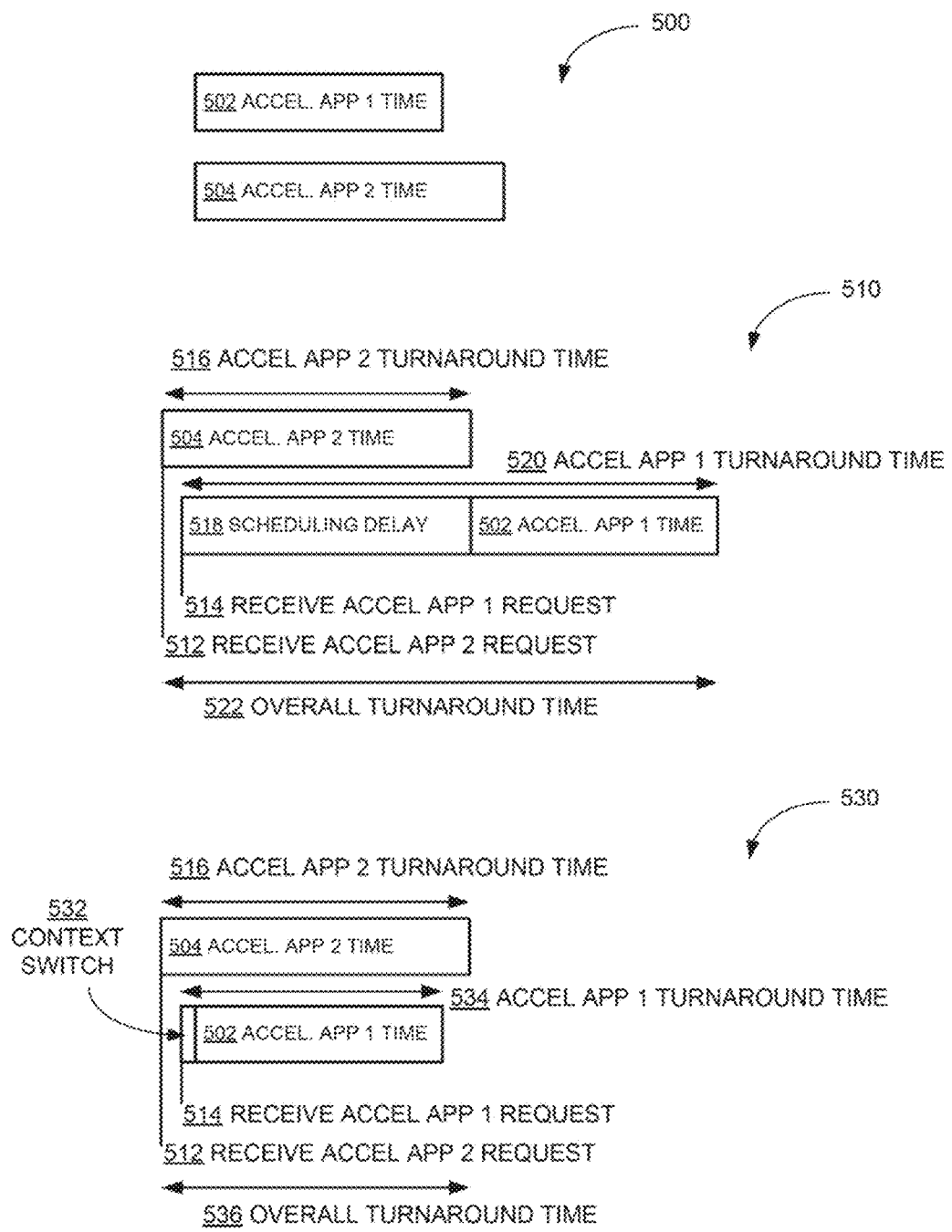
FIG. 5 illustrates how memory access context switching may be used to speed up accelerator application turnaround times.

FIG. 5 illustrates how memory access context switching may be used to speed up accelerator application turnaround times, arranged in accordance with at least some embodiments described herein.

According to an example scenario shown in diagram 500, two applications, app1 and app2 executed on an FPGA accelerator may have distinct processing times 502 and 504 for processing one block of data with app2 having a longer processing time. Both processing times may be longer than a communication latency of transferring one block of data. Two VMs, VM1 and VM2, may request to access the FPGA accelerator simultaneously, with VM1 requesting for app1 acceleration and VM2 requesting for app2 acceleration. Supposing that VM2's request arrives first and is serviced before VM1's request, a turnaround time 520 for VM1 may be the sum of scheduling delay 518 and processing time 502 for app1 while the turnaround time 516 for VM2 may be processing time 504 for app2. An overall turnaround time 522 for both requests may include a delay (difference between receipt time 512 for the first request and receipt time 514 for the second request) in addition to the longer turnaround time 520 for VM1. The timings for the above-described example scenario are shown in diagram 510.

The request of VM1 may not be scheduled to the FPGA accelerator until the request of VM2 is serviced, resulting in the scheduling delay 518 for VM1 to get its request serviced. Even though the DMA read channel may become idle when a block of data is transferred to app2 for processing, the request of VM1 may have to wait to be serviced until app2 finishes processing on the FPGA accelerator and raises an interrupt to the server. This unnecessary scheduling delay can be eliminated through a DMA context switch.

Diagram 530 shows, on the other hand the turnaround times for the VMs and the overall turnaround time for the same scenario when DMA context switching based scheduling is employed according to an example scenario. In a system according to some embodiments, once the request of VM2 finishes its use of DMA read channel, an immediate context switch to the request of VM1 may be implemented by the coprovisor 302. As shown in diagram 530, the overall turnaround time 536 may be reduced to the processing time of VM2 request, which is greater than the sum of the processing time for VM1 502 and the difference between receipt time 512 for the first request and receipt time 514 for the second request. Thus, while the turnaround time 516 for VM2 remains the same, the turnaround time 534 for VM1 may be reduced by the scheduling delay plus a context switch overhead time 532. The DMA context switch overhead time 532 may be substantially small because only one parameter (the bus address of the next DMA buffer descriptor) may need to be loaded into the DMA controller. Therefore, both VM1 and the overall turnaround time may be reduced through a DMA context switch leaving more idle time (or time to process other requests) to the FPGA accelerator.

Figure 6:
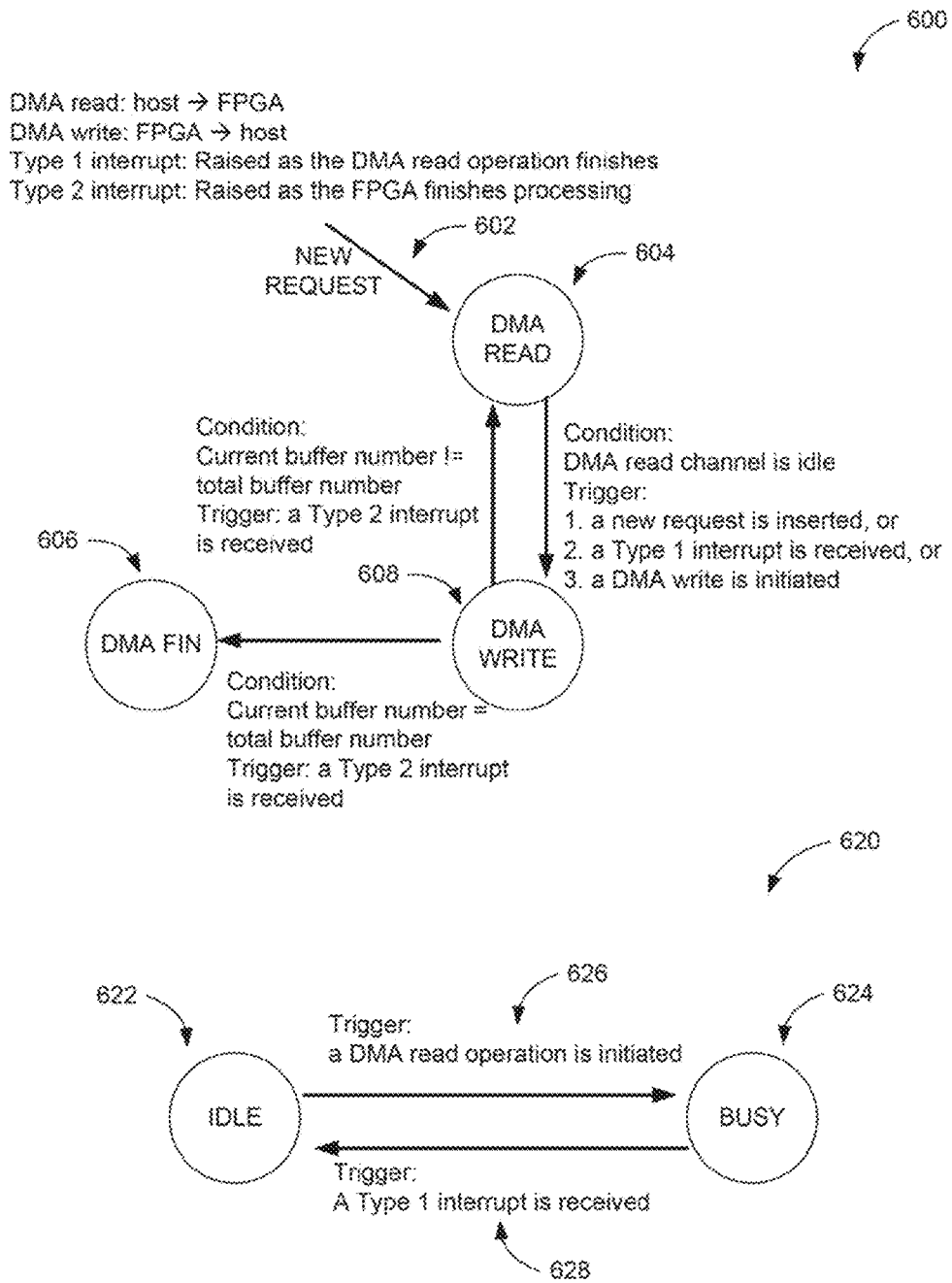
FIG. 6 illustrates a request state transition diagram and a direct memory access (DMA) READ channel state transition diagram in an example coprovisor-scheduled pipelined operation for a hardware accelerator.

FIG. 6 illustrates a request state transition diagram and a DMA READ channel state transition diagram in an example coprovisor-scheduled pipelined operation for a hardware accelerator, arranged in accordance with at least some embodiments described herein.

As shown in diagram 600, when a request is received from a VM, it may be marked with DMA READ state, which indicates the request is waiting for a DMA read operation. If the DMA read channel is in IDLE 622 state, the DMA read operation may be initiated (626) and the DMA read channel state may be updated with BUSY 624 state. When a DMA read operation finishes, a Type 1 interrupt may be received (628) from the hardware accelerator to release the DMA read channel, thereby modifying the DMA read channel state with IDLE 622.

According to an example embodiment shown in diagram 600, the scheduler may be invoked in at least the following three example cases: 1) a new request 602 is inserted into a queue; 2) a Type 1 interrupt is received; or 3) after initiating a DMA write operation 608. When the scheduler is invoked, the scheduler may first check if the DMA read channel is IDLE. If the DMA read channel is IDLE, the scheduler may schedule a request for a DMA read operation.

When a DMA read operation 604 finishes, a Type 1 interrupt may be received from the hardware accelerator to release the DMA read channel, thereby modifying the DMA read channel state with IDLE. If there is a request in another queue waiting for a DMA read operation, the DMA read operation may be re-initiated. When a Type 2 interrupt is received, the context of the request with DMA WRITE state may be loaded into the DMA controller to implement a DMA write operation, and the current buffer number may be incremented by one. If two head requests of the two queues are both in DMA WRITE state, a predefined bit (e.g. a bit in the accelerator status word 432 set by the accelerator application controller 330) may indicate to the scheduler which request has finished processing on the hardware accelerator.

Initiation of a DMA write operation may be followed by two cases. In one scenario, the request may still not be completely serviced. That is, there may still be some data in the DMA buffer fragments associated with the unfinished request. In this case, the state of the request may be updated with DMA READ after initiating the DMA write operation. In another scenario, the request may have completed its data processing (current buffer number=total buffer number). In that case, the request may be marked with DMA FIN state, and the request remover may be invoked to remove this finished request from the related queue.

Various example embodiments are described above using specific values, parameters, and configurations. These examples are for illustration purposes only and are not intended to constitute a limitation on embodiments. Embodiments may be implemented with any reasonable values and suitable parameters and configurations using the principles described herein.

Figure 7:
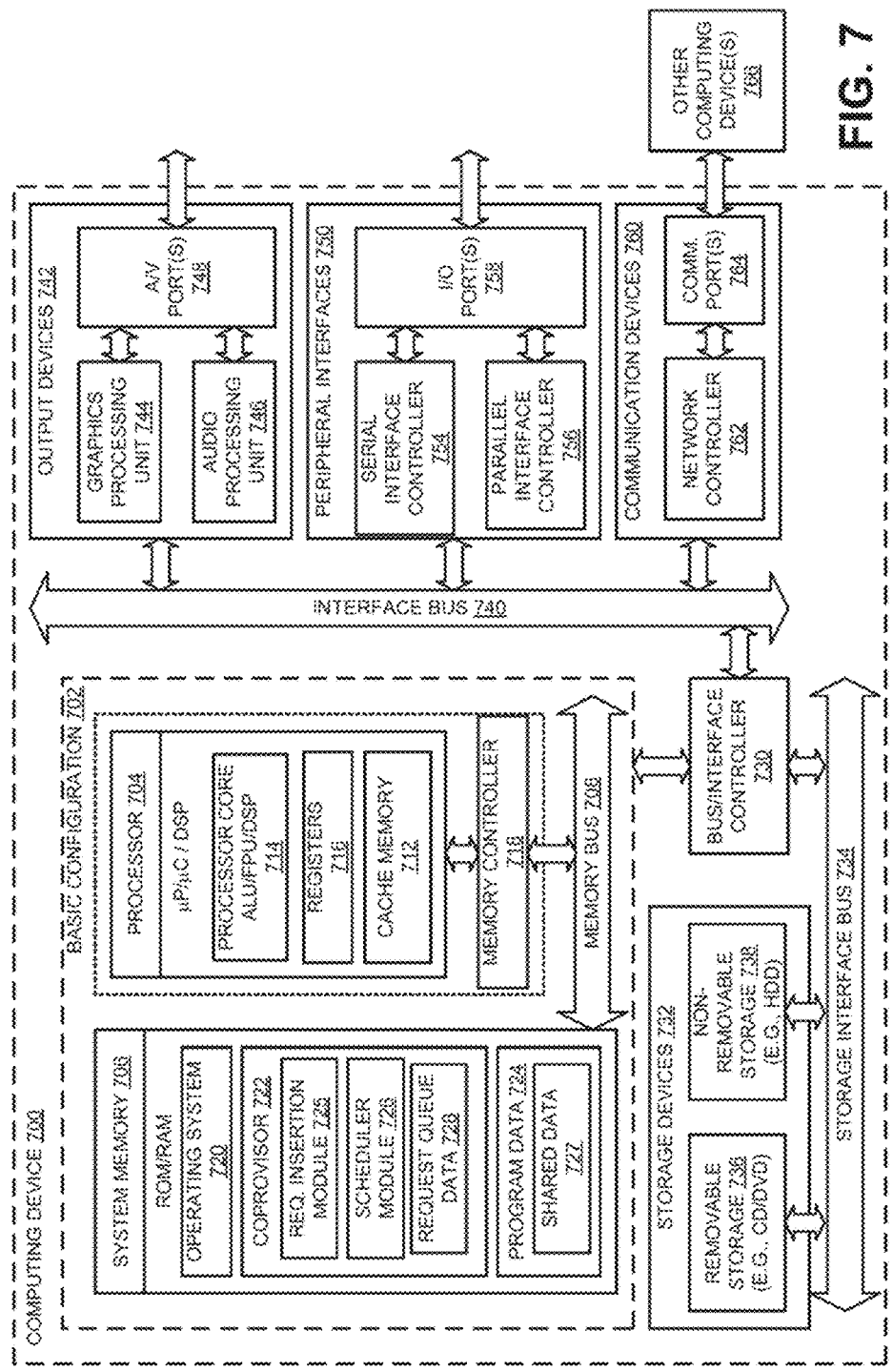
FIG. 7 illustrates a general purpose computing device, which may be used to provide virtualization of hardware accelerators.

FIG. 7 illustrates a general purpose computing device, which may be used to provide virtualization of hardware accelerators, arranged in accordance with at least some embodiments described herein.

In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level cache memory 712, a processor core 714, and registers 716. Example processor core 714 may include an arithmetic logic unit (ALU), a floating point unit (FPU), a digital signal processing core (DSP Core), or any combination thereof. An example memory controller 718 may also be used with processor 704, or in some implementations, memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, a coprovisor 722, and program data 724. The coprovisor 722 may include a request insertion module 725, a scheduler module 726 and request queue date 728. The coprovisor 722 may be similar in structure and functionality to the coprovisor 302 of FIG. 3 or FIG. 4. The request insertion module 725 may be similar in structure and functionality to the request inserter 410 of FIG. 4. The scheduler module 726 may be similar in structure and functionality to the scheduler 420 of FIG. 4. The request insertion module 725 may identify an access request from a VM for the first accelerator application executable on the hardware acceleration module and an access request from a VM for a second accelerator application executable on the hardware acceleration module. The scheduler module 726 may schedule access requests. Program data 724 may include shared data 727 and similar data as discussed above in conjunction with at least FIG. 1 through 6. This data may be useful for providing access to a virtualized hardware accelerator as is described herein. This described basic configuration 702 is illustrated in FIG. 7 by those components within the inner dashed line. Computing device 700 may be implemented as a server or other network device at a datacenter in some examples.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 750, and communication devices 760 to basic configuration 702 via bus/interface controller 730. Example output devices 742 include a graphics processing unit 744 and an audio processing unit 746, which may be configured to communicate to various external devices such as a display or speakers via one or more A/V ports 748. Example peripheral interfaces 750 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 760 includes a network controller 762, which may be arranged to facilitate communications with one or more other computing devices 766 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a physical server, virtual server, a computing cloud, or a hybrid device that include any of the above functions. Computing device 700 may also be implemented as a personal computer including both laptop computer and non-laptop computer configurations. Moreover, computing device 700 may be implemented as a networked system or as part of a general purpose or specialized server.

Networks for a networked system including computing device 700 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Example embodiments may also include methods to provide virtualization of hardware accelerators. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 8:
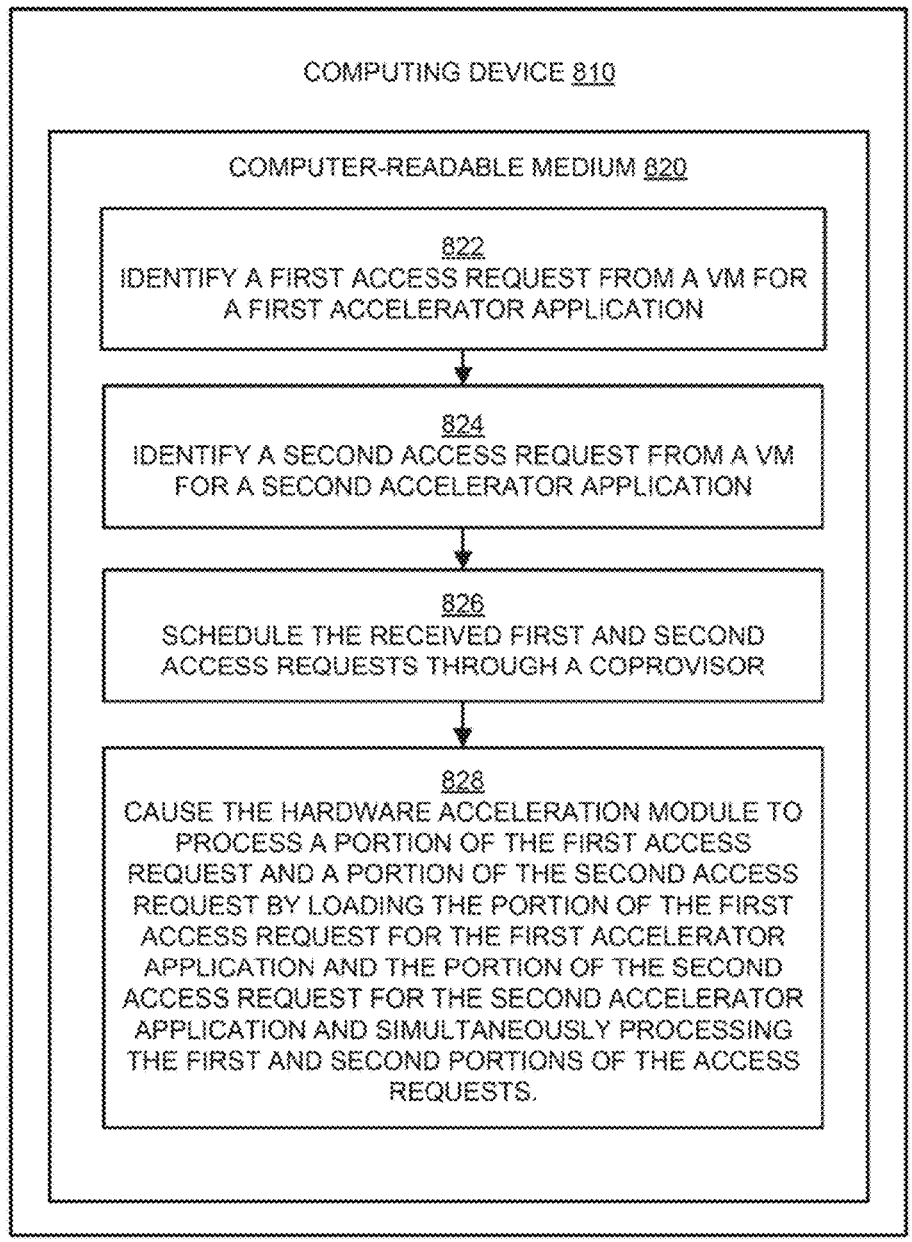
FIG. 8 is a flow diagram illustrating an example method to provide access to virtualized hardware accelerators that may be performed by a computing device such as the computing device in FIG. 7.

FIG. 8 is a flow diagram illustrating an example method to provide access to virtualized hardware accelerators that may be performed by a computing device such as the computing device in FIG. 7, arranged in accordance with at least some embodiments described herein.

Example methods may include one or more operations, functions or actions as illustrated by one or more of blocks 822 through 828, and may in some embodiments be performed by a computing device such as the computing device 700 in FIG. 7. The operations described in the blocks 822-828 may also be stored as computer-executable instructions in a non-transitory computer-readable medium such as a computer-readable medium 820 of a computing device 810.

An example method to provide access to virtualized hardware accelerators may begin with block 822, "IDENTIFY A FIRST ACCESS REQUEST FROM A VM FOR A FIRST ACCELERATOR APPLICATION," where the request inserter 410 may identify or receive an access request from a VM for an accelerator application on a hardware accelerator such as an FPGA.

Block 822 may be followed by block 824, "IDENTIFY A SECOND ACCESS REQUEST FROM A SECOND VM FOR A SECOND ACCELERATOR APPLICATION", where the request inserter 410 may identify or another access request from another VM for another accelerator application on the hardware accelerator. In conventional virtualization systems, such two requests may be handled sequentially.

Block 824 may be followed by block 826, "SCHEDULE THE FIRST ACCESS REQUEST AND THE SECOND ACCESS REQUEST THROUGH A COPROVISOR", where the scheduler 420 may schedule the received requests for both VMs.

Block 826 may be followed by block 828, "CAUSE THE HARDWARE ACCELERATION MODULE TO PROCESS A PORTION OF THE FIRST ACCESS REQUEST AND A PORTION OF THE SECOND ACCESS REQUEST BY LOADING THE PORTION OF THE FIRST ACCESS REQUEST FOR THE FIRST ACCELERATOR APPLICATION AND THE PORTION OF THE SECOND ACCESS REQUEST FOR THE SECOND ACCELERATOR APPLICATION AND SIMULTANEOUSLY PROCESSING THE FIRST AND SECOND PORTIONS OF THE ACCESS REQUESTS", where the coprovisor 302 may allow the hardware acceleration module 218 to process parts or all of the requests at the same time by using DMA context switching or comparable techniques, for example.

The operations included in the process of FIG. 8 described above are for illustration purposes. Access to virtualized hardware accelerators may be implemented by similar processes with fewer or additional operations, for example, further optimization operations may be added. In some examples, the operations may be performed in a different order. In some other examples, various operations may be eliminated. In still other examples, various operations may be divided into or supplemented with additional operations, or combined together into fewer operations. Although illustrated as sequentially ordered operations, in some implementations, the various operations may be performed in a different order, or in some cases, various operations may be performed at substantially the same time.

Figure 9:
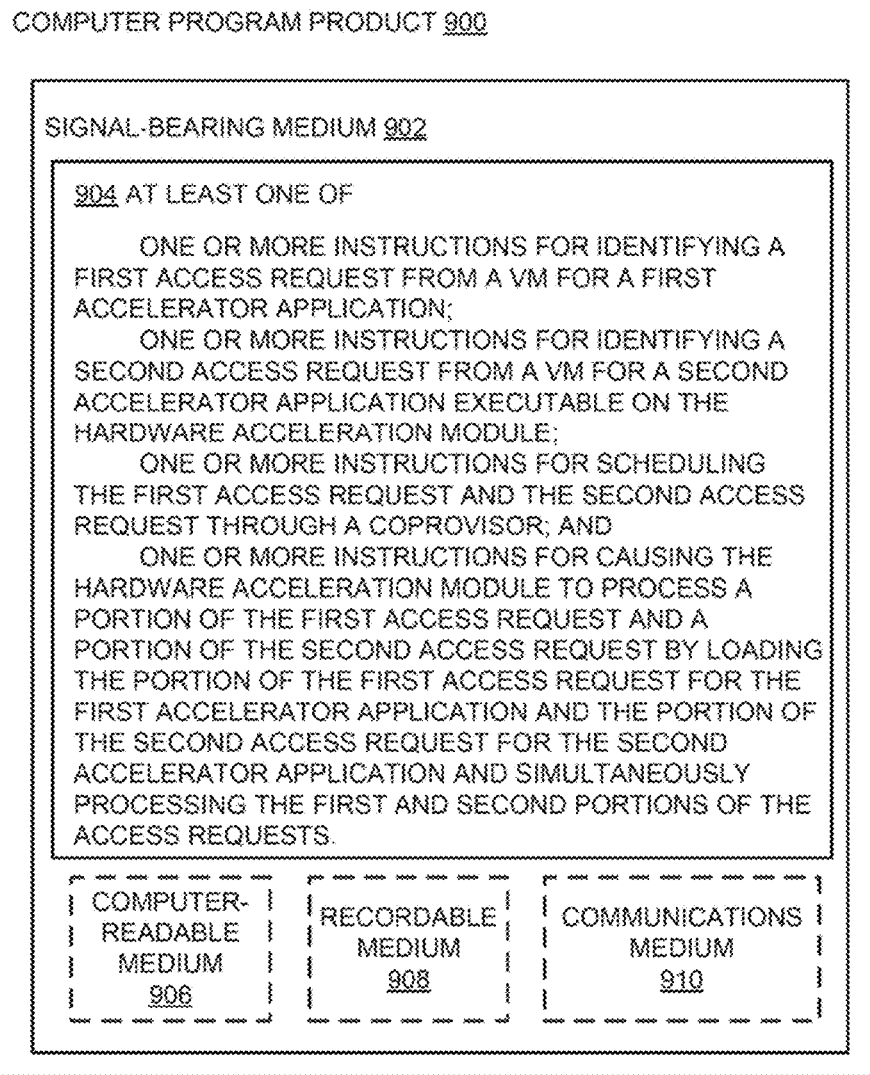
FIG. 9 illustrates a block diagram of an example computer program product, all arranged in accordance with at least some embodiments described herein.

FIG. 9 illustrates a block diagram of an example computer program product, arranged in accordance with at least some embodiments described herein.

In some examples, as shown in FIG. 9, computer program product 900 may include a signal bearing medium 902 that may also include machine-readable instructions 904 that, in response to execution by, for example, a processor, may provide the features described above with respect to FIG. 1 through FIG. 6. Thus, for example, referring to processor 704, one or more of the tasks shown in FIG. 9 may be undertaken in response to instructions 904 conveyed to the processor 704 by medium 902 to perform actions associated with access to virtualized hardware accelerators as described herein. Some of those instructions may include identifying a first access request from a VM for a first accelerator application; identifying a second access request from a second VM for a second accelerator application; scheduling the first access request and the second access request through a coprovisor; and/or causing the hardware acceleration module to process a portion of the first access request and a portion of the second access request by loading the portion of the first access request for the first accelerator application and the portion of the second access request for the second accelerator application and simultaneously processing the first and second portions of the access requests.

In some implementations, signal bearing medium 902 depicted in FIG. 9 may encompass a computer-readable medium 906, such as, but not limited to, a hard disk drive, a Compact Disc (CD), a Digital Versatile Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, computer program product 900 may be conveyed to the processor 904 by an RF signal bearing medium 902, where the signal bearing medium 902 is conveyed by a wireless communications medium 910 (e.g., a wireless communications medium conforming with the IEEE 802.11 standard).

According to some examples, a method to access a virtualized hardware acceleration module is provided. An example method may include identifying a first access request from a first virtual machine (VM) for a first accelerator application executable on the hardware acceleration module and identifying a second access request from a second VM for a second accelerator application executable on the hardware acceleration module. The method may also include scheduling the first access request and the second access request using a coprovisor. The method may further include causing the hardware acceleration module to process at least a portion of the first access request and a portion of the second access request by loading the portion of the first access request for the first accelerator application and the portion of the second access request for the second accelerator application and simultaneously processing the first and second portions of the access requests.

In other examples, the first VM and the second VM may be the same. The hardware acceleration module may be part of a field-programmable gate array (FPGA) or an application specific integrated circuit (ASIC). The first accelerator application and the second accelerator application may be executable on the hardware acceleration module at a same time.

A first data block associated with the first access request may be identified via a first shared memory space a second data block associated with the second access request may be identified via a second shared memory space. The first and second shared memory spaces may include a group of physical memory pages used for user-kernel space data transfer in a VM and an inter-VM data transfer, and the first and second shared memory spaces may be accessed by the hardware acceleration module for data fetching and writing back. A size associated with the first shared memory space and/or the second shared memory space may be adjusted based on a priority associated with the first VM and/or the second VM.

In further examples, the first and second access requests for the first and second accelerator applications may be executed in a direct memory access (DMA) read operation stage, an accelerator application computation stage, and a DMA write operation stage, where the DMA read operation stage and the DMA write operation stage may be implemented substantially simultaneously. Scheduling the first access request and the second access request may include scheduling the first access request and the second access request based on a first memory access context associated with the first accelerator application and/or a second memory access context associated with the second accelerator application. The first memory access context and the second memory access context may be based on RCBs associated with the first VM or the second VM accessing the first accelerator application and the second accelerator application, respectively. Scheduling the first access request and the second access request may include scheduling the first access request and the second access request by inserting the first access request in a first request queue associated with the first accelerator application and inserting the second access request in a second request queue associated with the second accelerator application.

In yet further examples, causing the hardware acceleration module to process may include causing the hardware acceleration module to process the portion of the first access request and/or the portion of the second access request based on a status of the hardware acceleration module. The status of the hardware acceleration module and/or a status of a device driver associated with the hardware acceleration module may be retrieved from an accelerator status word. Causing the hardware acceleration module to process may include causing the hardware acceleration module to process the portion of first access request and/or the portion of the second access request using a pipelining process. The pipelining process may include increasing a computation frequency associated with a computation core for the first accelerator application and/or the second accelerator application, increasing a number of computation cores associated with the first accelerator application and/or the second accelerator application, delaying a start time of a memory read operation associated with the first accelerator application and/or the second accelerator application, delaying a start time of a computation operation associated with the first accelerator application and/or the second accelerator application, and/or simultaneously executing a memory access read operation and a memory access write operation associated with the first access request or the second access request for the first accelerator application and the second accelerator application, respectively.

According to some embodiments, a coprovisor configured to virtualize a hardware acceleration module is described. An example coprovisor may include a request insertion module executable on a processor. The request insertion module may be configured to identify a first access request from a first virtual machine (VM) for a first accelerator application executable on the hardware acceleration module and identify a second access request from a second VM for a second accelerator application executable on the hardware acceleration module. The example coprovisor may also include a scheduler module executable on a same processor. The scheduler module may be configured to schedule the first access request and the second access request. The coprovisor may be configured to cause the hardware acceleration module to process at least a portion of the first access request and a portion of the second access request by loading the portion of the first access request for the first accelerator application and the portion of the second access request for the second accelerator application and simultaneously processing the first and second portions of the access requests.

In other embodiments, the first VM and the second VM may be the same. The hardware acceleration module may be part of a field-programmable gate array (FPGA) or an application specific integrated circuit (ASIC). The first accelerator application and the second accelerator application may be executable on the hardware acceleration module at a same time. The coprovisor may be further configured to identify a first data block associated with the first access request via a first shared memory space and a second data block associated with the second access request via a second shared memory space. The first and second shared memory spaces may include a group of physical memory pages used for user-kernel space data transfer in a VM and an inter-VM data transfer, and the first and second shared memory spaces may be accessed by the hardware acceleration module for data fetching and writing back.

In further embodiments, the coprovisor may be further configured to adjust a size associated with the first shared memory space and/or the second shared memory space based on a priority associated with the first VM and/or the second VM. The first and second access requests for the first and second accelerator applications may be executed in a direct memory access (DMA) read operation stage, an accelerator application computation stage, and a DMA write operation stage, where the DMA read operation stage and the DMA write operation stage may be implemented substantially simultaneously. The scheduler module may be configured to schedule the first VM access request and the second VM access request based on a first memory access context associated with the first accelerator application and/or a second memory access context associated with the second accelerator application. The first memory access context and the second memory access context may be based on RCBs associated the first VM or the second VM accessing the first accelerator application and the second accelerator application, respectively. The scheduler module may be configured to schedule the first VM access request and the second VM access request through insertion of the first access request in a first request queue associated with the first accelerator application and insertion of the second access request in a second request queue associated with the second accelerator application.

In yet further embodiments, the coprovisor may be configured to cause the hardware acceleration module to process the portion of the first access request and/or the portion of the second access request based on a status of the hardware acceleration module, where the coprovisor may be configured to retrieve the status of the hardware acceleration module and/or a status of a device driver associated with the hardware acceleration module from an accelerator status word. The coprovisor may be configured to cause the hardware acceleration module to process the portion of the first access request and/or the portion of the second access request through a pipelining process. The pipelining process may include to increase a computation frequency associated with a computation core for the first accelerator application and/or the second accelerator application, increase a number of computation cores associated with the first accelerator application and/or the second accelerator application, delay a start time of a memory read operation associated with the first accelerator application and/or the second accelerator application, delay a start time of a computation operation associated with the first accelerator application and/or the second accelerator application, and/or simultaneously execute a memory access read operation and a memory access write operation associated with the first access request or the second access request for the first accelerator application and the second accelerator application, respectively.

According to some examples, a datacenter configured to virtualize hardware acceleration is described. The datacenter may include at least a first virtual machine (VM) and a second VM, each operable to be executable on one or more physical machines, a hardware acceleration module configured to execute at least a first accelerator application and a second accelerator application, and a datacenter controller executable on one or more servers. The datacenter controller may be configured to identify a first access request from a first virtual machine (VM) for a first accelerator application executable on the hardware acceleration module and identify a second access request from a second VM for a second accelerator application executable on the hardware acceleration module. The datacenter controller may also be configured to schedule the first access request and the second access request, and cause the hardware acceleration module to process at least a portion of the first access request and a portion of the second access request by loading the portion of the first access request for the first accelerator application and the portion of the second access request for the second accelerator application and simultaneously processing the first and second portions of the access requests.

In other examples, the first VM and the second VM may be the same. The hardware acceleration module may be part of a field-programmable gate array (FPGA) or an application specific integrated circuit (ASIC). The first accelerator application and the second accelerator application may be executable on the hardware acceleration module at a same time. The controller may be further configured to identify a first data block associated with the first access request via a first shared memory space and a second data block associated with the second access request via a second shared memory space. The first and second shared memory spaces may include a group of physical memory pages used for user-kernel space data transfer in a VM and an inter-VM data transfer, and the first and second shared memory spaces may be accessed by the hardware acceleration module for data fetching and writing back. The controller may be further configured to adjust a size associated with the first shared memory space and/or the second shared memory space based on a priority associated with the first VM and/or the second VM.

In further examples, the first and second access requests for the first and second accelerator applications may be executed in a direct memory access (DMA) read operation stage, an accelerator application computation stage, and a DMA write operation stage, where the DMA read operation stage and the DMA write operation stage may be implemented substantially simultaneously. The controller may be configured to schedule the first VM access request and the second VM access request based on a first memory access context associated with the first accelerator application and/or a second memory access context associated with the second accelerator application. The first memory access context and the second memory access context may be based on RCBs associated with the first VM or the second VM accessing the first accelerator application and the second accelerator application, respectively. The controller may be configured to schedule the first VM access request and the second VM access request through insertion of the first access request in a first request queue associated with the first accelerator application and insertion of the second access request in a second request queue associated with the second accelerator application.

In yet further examples, the hardware acceleration module may be further configured to process the portion of the first access request and/or the portion of the second access request based on a status of the hardware acceleration module, where the controller may be further configured to retrieve the status of the hardware acceleration module and/or a status of a device driver associated with the hardware acceleration module from an accelerator status word. The hardware acceleration module may be configured to process the portion of the first access request and/or the portion of the second access request through a pipelining process. The pipelining process may include to increase a computation frequency associated with a computation core for the first accelerator application and/or the second accelerator application, increase a number of computation cores associated with the first accelerator application and/or the second accelerator application, delay a start time of a memory read operation associated with the first accelerator application and/or the second accelerator application, delay a start time of a computation operation associated with the first accelerator application and/or the second accelerator application, and/or simultaneously execute a memory access read operation and a memory access write operation associated with the first access request or the second access request for the first accelerator application and the second accelerator application, respectively.

According to yet further examples, a non-transitory computer readable storage medium may store instructions to access a virtualized hardware acceleration module at a datacenter. In response to execution of the instructions on one or more computing devices, methods similar to those described herein may be executed.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in pan, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together. A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to access a virtualized hardware acceleration module in a system having a coprovisor that executes within a virtual machine manager, wherein the virtualized hardware acceleration module is a field-programmable gate array (FPGA) or an application specific integrated circuit (ASIC), the method comprising:

identifying a first access request, from a first virtual machine (VM), for a first accelerator application executable on the virtualized hardware acceleration module;

identifying a second access request, from a second VM, for a second accelerator application executable on the virtualized hardware acceleration module;

scheduling the first access request and the second access request by use of the coprovisor; and causing, by the coprovisor, the virtualized hardware acceleration module to simultaneously process at least a portion of the first access request and at least a portion of the second access request by execution of the first accelerator application and the second accelerator application respectively, wherein:

each of the first accelerator application and the second accelerator application are implemented in a read operation stage, via a read channel of the virtualized hardware acceleration module that implements a single read operation stage at a time, and in a write operation stage, via a write channel of the hardware acceleration module that implements a single write operation stage at a time, and simultaneous processing of the portion of the first access request and the portion of the second access request includes:

initiating, by the coprovisor, the read operation stage of the first accelerator application for the portion of the first access request when the read channel is in an idle state;

receiving a first interrupt from the virtualized hardware acceleration module indicating that the read operation stage of the first accelerator application has finished and that the read channel has been returned to the idle state;

initiating simultaneously, by the coprovisor, the write operation stage of the first accelerator application in response to the first interrupt, and the write channel is in an idle state, and the read operation stage of the second accelerator application for the portion of the second access request, which places the read channel and the write channel into a busy state;

receiving a second interrupt from the virtualized hardware acceleration module indicating that the write operation stage of the first accelerator application has finished and that the write channel has been returned to the idle state; and initiating the write operation stage of the second accelerator application in response to the second interrupt.

2. The method of claim 1, further comprising:

identifying a first data block, associated with the first access request, in a first shared memory space; and identifying a second data block, associated with the second access request, in a second shared memory space, wherein the first shared memory space and the second shared memory space comprise a group of physical memory pages used for user-kernel space data transfer in a VM and an inter-VM data transfer, and wherein the first shared memory space and the second shared memory space are accessed by the virtualized hardware acceleration module for data fetch and data write.

3. The method of claim 2, further comprising adjusting a size associated with at least one of the first shared memory space and the second shared memory space based on a priority associated with at least one of the first VM and the second VM.

4. The method of claim 1, wherein:

the first access request and the second access request for the respective first accelerator application and the second accelerator application are further executed in an accelerator application computation stage.

5. The method of claim 1, wherein:

scheduling the first access request and the second access request includes scheduling the first access request and the second access request based on at least one of a first memory access context associated with the first accelerator application and a second memory access context associated with the second accelerator application, and the first memory access context is based on a first request control block associated with the first access request and the second memory access context is based on a second request control block associated with the second access request, wherein the first request control block and the second request control block include information to schedule the first access request and the second access request.

6. The method of claim 1, wherein scheduling the first access request and the second access request includes scheduling the first access request and the second access request by inserting the first access request in a first request queue associated with the first accelerator application and inserting the second access request in a second request queue associated with the second accelerator application.

7. The method of claim 1, wherein causing the virtualized hardware acceleration module to process includes causing the virtualized hardware acceleration module to process the portion of the first access request and/or the portion of the second access request based on a status of the virtualized hardware acceleration module.

8. The method of claim 7, further comprising retrieving at least one of the status of the virtualized hardware acceleration module and a status of a device driver associated with the virtualized hardware acceleration module from an accelerator status word.

9. The method of claim 1, wherein causing the virtualized hardware acceleration module to process includes causing the virtualized hardware acceleration module to process the portion of the first access request and/or the portion of the second access request by use of a pipelining process that includes at least one of:

increasing a computation frequency associated with a computation core for at least one of the first accelerator application and/or the second accelerator application;

increasing a number of computation cores associated with at least one of the first accelerator application and/or the second accelerator application;

delaying a start time of a memory read operation associated with at least one of the first accelerator application and the second accelerator application;

delaying a start time of a computation operation associated with at least one of the first accelerator application and the second accelerator application; and simultaneously executing a memory access read operation and a memory access write operation associated with the first access request and the second access request for the first accelerator application and the second accelerator application, respectively.

10. A system to virtualize a hardware acceleration module having a coprovisor that executes within a virtual machine manager, the system comprising:

the hardware acceleration module, wherein the hardware acceleration module is a field-programmable gate array (FPGA) or an application specific integrated circuit (ASIC); and the coprovisor, which comprises a request insertion module and a scheduler module executable on a processor;

wherein the request insertion module is configured to:

identify a first access request, from a first virtual machine (VM), for a first accelerator application executable on the hardware acceleration module; and identify a second access request, from a second VM, for a second accelerator application executable on the hardware acceleration module;

the scheduler module configured to:

schedule the first access request and the second access request;

the coprovisor configured to cause the hardware acceleration module to simultaneously process at least a portion of the first access request and at least a portion of the second access request by execution of the first accelerator application and the second accelerator application respectively, wherein each of the first accelerator application and the second accelerator application are implemented in a read operation stage, via a read channel of the hardware acceleration module that implements a single read operation stage at a time, and in a write operation stage, via a write channel of the hardware acceleration module that implements a single write operation stage at a time, wherein simultaneously processing the portion of the first access request and the portion of the second access request includes:

initiating, by the coprovisor, the read operation stage of the first accelerator application for the portion of the first access request when the read channel is in an idle state;

receiving a first interrupt from the hardware acceleration module indicating that the read operation stage of the first accelerator application has finished and that the read channel has been returned to the idle state;

initiating simultaneously, by the coprovisor, the write operation stage of the first accelerator application in response to the first interrupt, and the write channel is in an idle state, and the read operation stage of the second accelerator application for the portion of the second access request, which places the read channel and the write channel into a busy state;

receiving a second interrupt from the hardware acceleration module indicating that the write operation stage of the first accelerator application has finished and that the write channel has been returned to the idle state; and initiating the write operation stage of the second accelerator application in response to the second interrupt.

11. The system of claim 10, wherein the first VM and the second VM are a same VM.

12. The system of claim 10, wherein the coprovisor is further configured to identify:

a first data block, associated with the first access request, in a first shared memory space; and a second data block, associated with the second access request, in a second shared memory space, wherein the first shared memory space and the second shared memory space comprise a group of physical memory pages used for user-kernel space data transfer in a VM and an inter-VM data transfer, and wherein the first shared memory space and the second shared memory space are accessed by the hardware acceleration module for data fetch and data write.

13. The system of claim 12, wherein the coprovisor is further configured to adjust a size associated with at least one of the first shared memory space and the second shared memory space based on a priority associated with at least one of the first VM and the second VM.

14. The system of claim 10, wherein:

the first access request and the second access request for the respective first accelerator application and the second accelerator application are further executed in an accelerator application computation stage.

15. The system of claim 10, wherein:

the scheduler module is configured to schedule the first access request and the second access request based on at least one of a first memory access context associated with the first accelerator application and a second memory access context associated with the second accelerator application, and the first memory access context is based on a first request control block associated with the first access request and the second memory access context is based on a second request control block associated with the second access request, wherein the first request control block and the second request control block include information for scheduling the first access request and the second access request.

16. The system of claim 10, wherein the scheduler module is configured to schedule the first access request and the second access request through insertion of the first access request in a first request queue associated with the first accelerator application and insertion of the second access request in a second request queue associated with the second accelerator application.

17. The system of claim 10, wherein the coprovisor is configured to cause the hardware acceleration module to process the portion of the first access request and/or the portion of the second access request based on a status of the hardware acceleration module.

18. The system of claim 17, wherein the coprovisor is configured to retrieve at least one of the status of the hardware acceleration module and a status of a device driver associated with the hardware acceleration module from an accelerator status word.

19. The system of claim 10, wherein the coprovisor is configured to cause the hardware acceleration module to process the portion of the first access request and/or the portion of the second access request through a pipelining process that includes at least one of:

increase a computation frequency associated with a computation core for at least one of the first accelerator application and/or the second accelerator application;

increase a number of computation cores associated with at least one of the first accelerator application and/or the second accelerator application;

delay a start time of a memory read operation associated with at least one of the first accelerator application and the second accelerator application;

delay a start time of a computation operation associated with at least one of the first accelerator application and the second accelerator application; and simultaneously execute a memory access read operation and a memory access write operation associated with the first access request and the second access request for the first accelerator application and the second accelerator application, respectively.

* * * * *